(12) United States Patent
Pfeiffer et al.

(10) Patent No.: US 8,108,066 B2
(45) Date of Patent: Jan. 31, 2012

(54) INCREMENTAL ENCODER AND SERIALIZER

(75) Inventors: Michael William Pfeiffer, Savage, MN (US); Eric Douglas Johnson, Minneapolis, MN (US); Richard Gordon Goodrich, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 889 days.

(21) Appl. No.: 11/949,023

(22) Filed: Dec. 1, 2007

(65) Prior Publication Data

US 2009/0143893 A1    Jun. 4, 2009

(51) Int. Cl.
G05B 15/00 (2006.01)
G05D 23/00 (2006.01)
B29C 45/00 (2006.01)
G06F 7/00 (2006.01)

(52) U.S. Cl. ......... 700/226; 700/278; 700/200; 700/213

(58) Field of Classification Search ......................... None
See application file for complete search history.

(56) References Cited

U.S. PATENT DOCUMENTS

| | | | |
|---|---|---|---|
| 4,486,845 A | 12/1984 | Duckworth | |
| 4,914,437 A * | 4/1990 | Kibrick et al. | 341/3 |
| 4,934,821 A * | 6/1990 | Morton | 348/107 |
| 5,021,781 A * | 6/1991 | Salazar et al. | 341/13 |
| 5,926,122 A * | 7/1999 | Dalton | 341/117 |
| 5,939,712 A | 8/1999 | Venugopal | |
| 6,683,543 B1 * | 1/2004 | Yeo | 341/13 |
| 6,970,108 B1 * | 11/2005 | Cullen | 341/11 |
| 7,063,204 B1 | 6/2006 | Pfeiffer | |
| 7,094,978 B2 | 8/2006 | Skurnik | |
| 2006/0106492 A1 * | 5/2006 | Gerat et al. | 700/245 |

* cited by examiner

*Primary Examiner* — Gene Crawford
*Assistant Examiner* — Yolanda Cumbess
(74) *Attorney, Agent, or Firm* — Mitchell K. McCarthy

(57) ABSTRACT

An apparatus and associated method directed to encoding data from an object in order to simultaneously identify a serialization value of the object from the data while incrementally tracking the object's position from the data.

20 Claims, 5 Drawing Sheets

US 8,108,066 B2

INCREMENTAL ENCODER AND SERIALIZER

BACKGROUND

Manufacturing lines have generally evolved in complexity by the integration of highly sophisticated automation devices and methods. Gains in productivity continue to be realized as past reliance on human judgment and manipulation is replaced by processor-driven systems. The repeatability of such intelligent systems enables maximizing both quality and production throughput velocity.

There has also been a general trend toward integrating fabrication and testing operations into the final assembly processes as much as possible. Complex factory information systems are used to gather real time information about the product and disperse it among other nodes, such as downstream processing stations and data collection banks.

It is particularly useful for a processing station to have the capability of ascertaining information about a particular product as it enters the station, so that it can act dynamically according to the information. For example, based on observed qualitative information about the product, the processing station could initiate a selected processing sequence from a plurality of different sequences stored in memory. Also, qualitative information about the product could be used to precisely position the product in the station for processing in accordance with different respective processing sequences.

However, the order with which different products or different versions of a product arrive at a particular processing station can differ from the way they are started down a manufacturing line. For example, products can be directed from a main conveyor path to a spur, such as according to needs associated with product differentiation and/or test procedures. Some products may inherently require longer testing than others, or sometimes a product will require retesting or additional testing. While one product is relegated to a spur it is advantageous to continue other products down the main conveyor. However, sequential disorder results when the object in the spur is returned to the main conveyor.

There is a long felt need in the industry for a fully automatic approach to serializing products as they are conveyed along a path. It is to that need that the claimed embodiments are directed.

SUMMARY

Claimed embodiments are generally directed to retrieving data from an object in order to simultaneously identify a serialization value of the object while incrementally tracking its position.

In some embodiments an apparatus and associated method are provided for storing first indicia to a first media on a first object of a plurality of objects, and storing second indicia that are characteristically different than the first indicia to a second media on a second object of the plurality of objects. The objects and an incremental encoder are then moved with respect to each other. During the moving, data is retrieved with the incremental encoder from a selected object's stored indicia for simultaneously identifying a serialization value indicating which object of the plurality of objects is involved in the moving step while incrementally position-controlling the selected object.

These and various other features and advantages which characterize the claimed embodiments will become apparent upon reading the following detailed description and upon reviewing the associated drawings.

DETAILED DESCRIPTION

Figure 1:
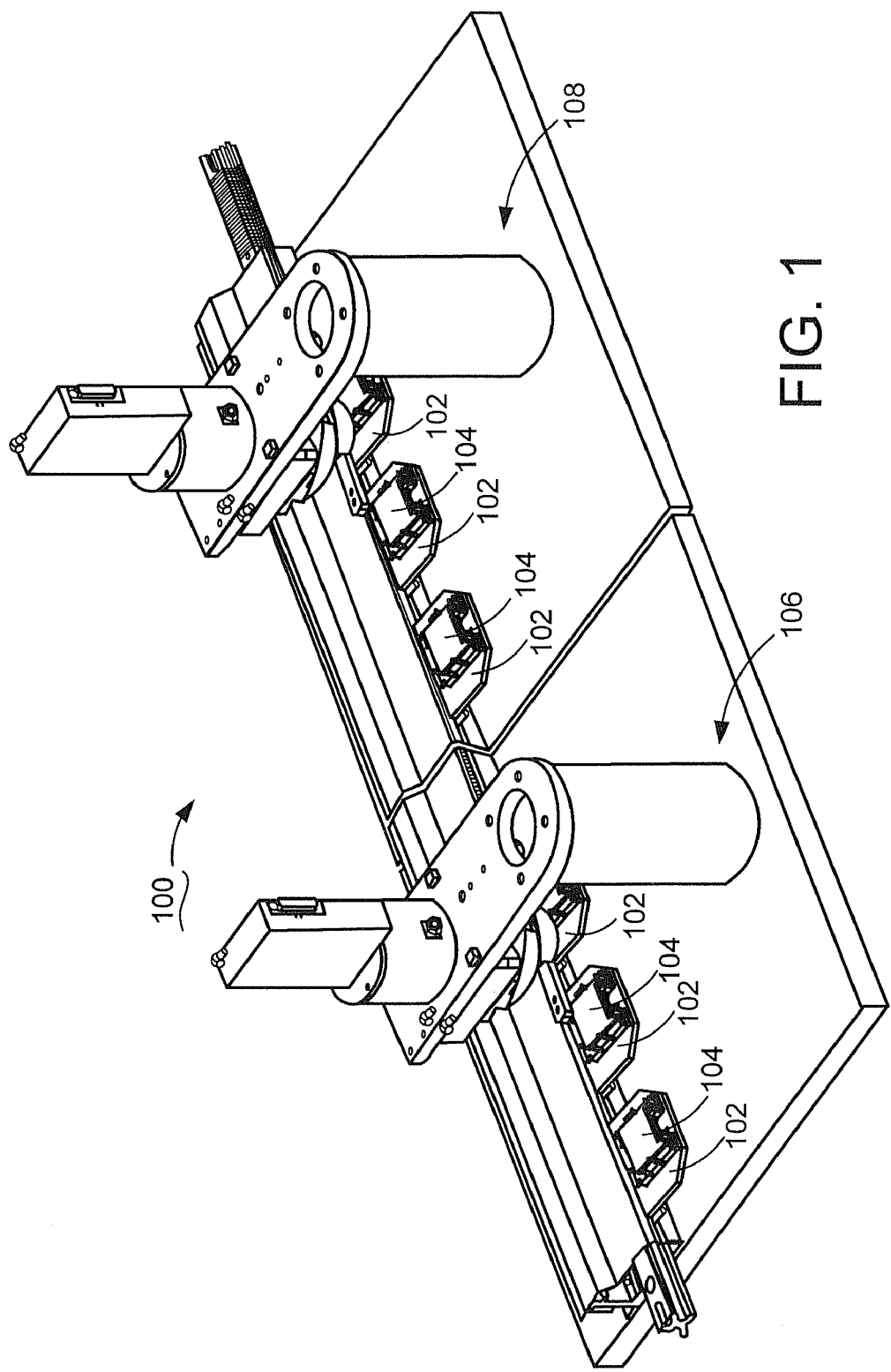
FIG. 1 is an isometric depiction of a conveyor system constructed in accordance with claimed embodiments.

FIG. 1 is an isometric depiction of a portion of a conveyor system 100 that is constructed in accordance with claimed embodiments. The system 100 transfers each of a number of pallets 102 supporting work product 104 to each of a number of processing stations 106, 108, as well as to other processing stations not depicted. The processing stations 106, 108 can perform various tasks such as fabrication, assembly, or testing processes on the work products 104. Preferably, the pallet 102 is configured to suitably fix the work product 104 so that the various tasks can be performed without repositioning the work product 104 with respect to the pallet 102. In order to do so, the conveyor system 100 must be capable of precisely and reliably positioning the pallet 102.

Figure 2:
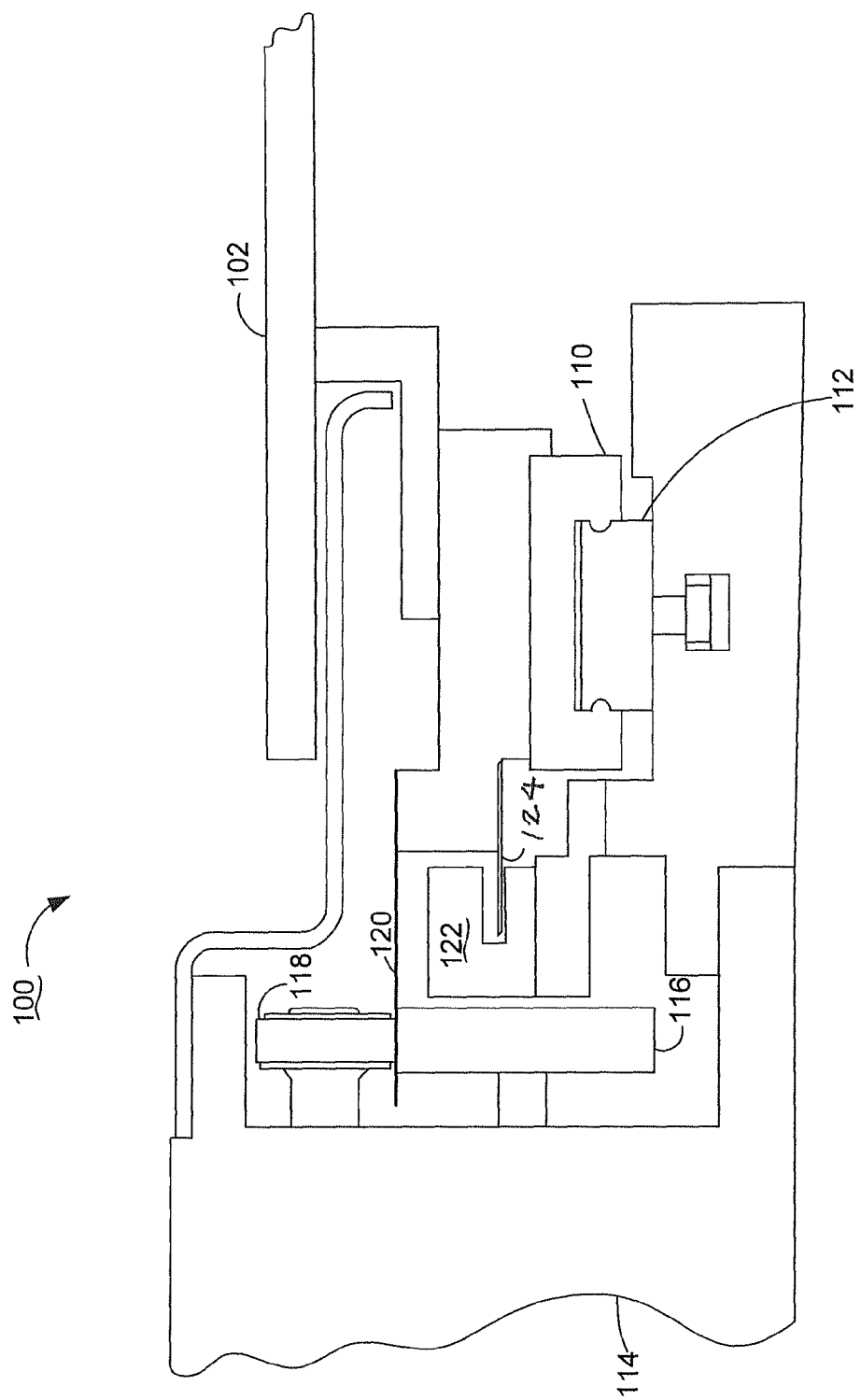
FIG. 2 is an end of the conveyor system of FIG. 1.

FIG. 2 is an end view of the conveyor assembly 100. The pallet 102 is supported upon a carriage bearing 110 that slidingly engages a longitudinal rail 112. Motors 114, such as but not limited to stepper motors, actuate driven rollers 116. Opposing idler rollers 118 cooperate with the driven rollers 116 to positively engage a relatively thin sheet 120 that is affixed to and extends from the pallet 102.

The skilled artisan will understand that the positive engagement between the rollers 116, 118 and the pallet 102 are merely illustrative and not limiting of the present embodiments as claimed. The positive engagement permits transporting the pallets 102 at far greater acceleration and deceleration rates than a mere frictional engagement would permit, such as in the case of using a belt or roller type conveyor. However, the simultaneous incremental encoding and serializing features of the present embodiments are useful in friction conveyors as well, such as but not limited to those depicted in U.S. Pat. No. 7,063,204, U.S. Pat. No. 6,729,463, and U.S. Pat. No. 6,460,683, all of which are assigned to the present applicant and incorporated by reference herein in their entirety.

Figure 3:
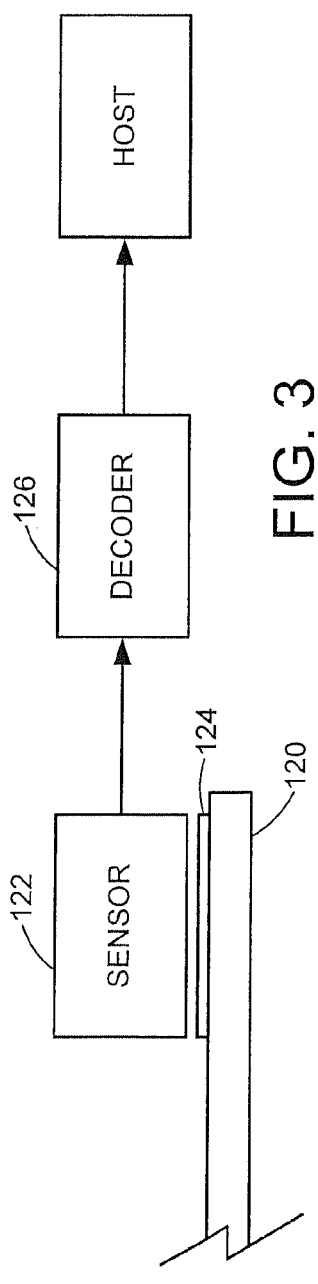
FIG. 3 diagrammatically depicts the incremental encoder in the conveyor system of FIG. 1.

For precisely positioning the pallet 102, FIGS. 2 and 3 depict the conveyor system 100 employing an incremental encoder including a sensor 122 that is disposed in a data transfer relationship with an encoded media 124 that is affixed to the pallet 102, and thereby fixed in movement with the sheet 120. The sensor 122 is an input to a decoder circuit 126 that can exist partially or entirely in hardware or software. The decoder circuit 126 functions to execute programming instructions stored in memory to simultaneously identify the pallet 120 from a group of serialized pallets while tracking incremental position of the pallet 120.

The type of sensor 122 is selected for the desired form of the media 124 used, which in various illustrative embodiments can be any of numerous different forms such as but not limited to magnetic media and optical media. For purposes of the description below, the sensor 122 can be a transducer in a data transfer relationship with an optical media, although the claimed embodiments are certainly not so limited.

Figure 4:
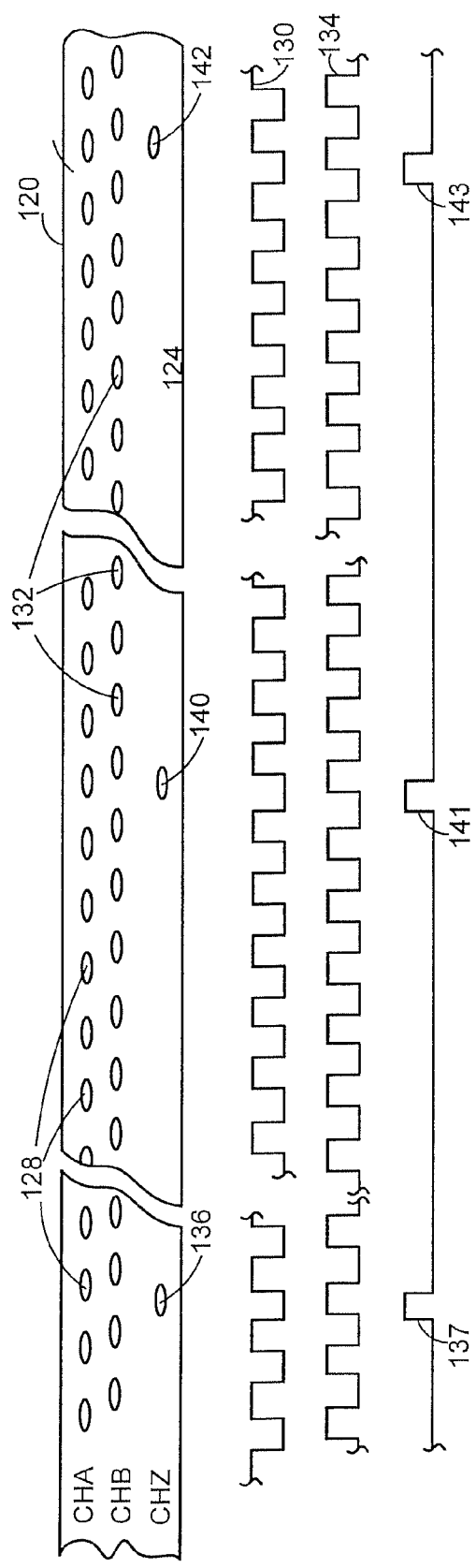
FIG. 4 diagrammatically depicts the encoded media of the incremental encoder of FIG. 3.

FIG. 4 depicts a strip of media 124 with optical indicia encoded thereon in a fashion such that the sensor 122 transduces the indicia in three discrete channels denoted A, B, and Z. More particularly, a periodic pattern of indicia denoted 128 produces a square waveform pattern denoted 130 in the A channel interface between the sensor 122 and the decoder circuit 126. Similarly, another like periodic pattern of indicia denoted 132 produces the offset square waveform pattern denoted 134 in the B channel interface. The decoder circuit 126 combines the A and B channel waveforms 130, 134 into a quadrature pulse waveform. The direction of relative movement between the sheet 120 and the sensor 122 is ascertainable in terms of which waveform 130, 134 is leading the other. Incremental displacement is ascertainable by counting the number of quadrature pulses during the displacement.

A baseline indicia 136 is encoded to the media 124 with respect to a reference position on the sheet 120. The corresponding pulse 137 in the Z channel provides the decoder circuit 126 with an indication of incremental position which can be tracked in either direction therefrom.

Generally, the claimed embodiments contemplate encoding one or more other Z channel indicia 140, 142 that are spatially disposed from the baseline indicia 136 in varying patterns that, when transduced, produce respective pulses 137, 141, 143 defining a unique serialization value for each corresponding pallet 102.

Figure 5:
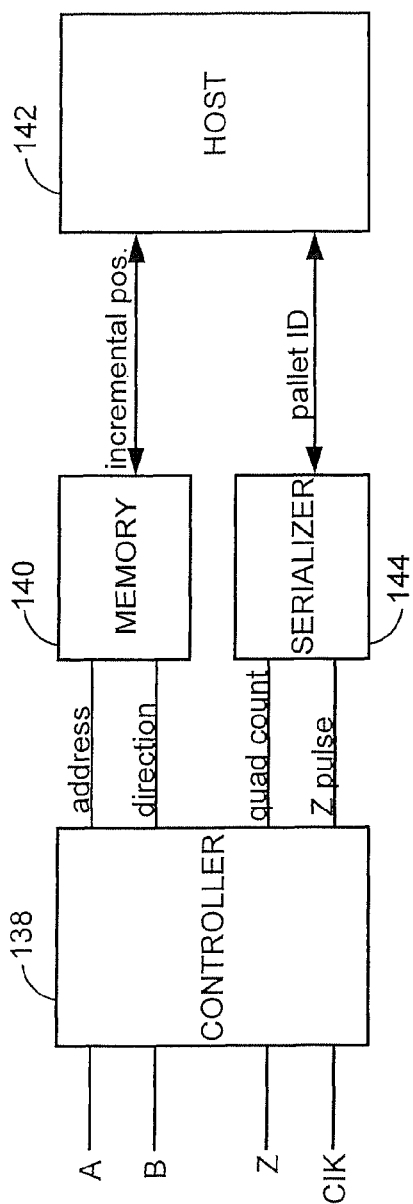
FIG. 5 is a functional block diagram of the decoder circuit in the incremental encoder of FIG. 3.

For example, FIG. 5 depicts a functional block diagram of the decoder circuit 126 which can be embodied entirely in software or in circuitry such as but not limited to a field programmable gate array or an application specific integrated circuit. A processor based controller 138 receives inputs from each of the A, B, and Z channels as well as a clock signal. The controller 138 continuously samples the waveforms in the three channels and calculates address and direction data that is buffered in a memory 140. Incremental positioning of the pallet 120 is thereby available to a host 142, such as a local or central processor controlling activities of the conveyor system 100.

The controller 138 simultaneously provides a quadrature burst count and Z channel pulse information to a serializer 144 that reports a unique pallet identification value to the host 142. Generally, the serializer 144 functions to count the number of periodic reference pulses from a displacement pattern waveform, such as the number of quadrature pulse counts in the illustrative embodiments, to calculate the spatial disposition of a predetermined number of reference pulses on the Z channel. The serializer thus derives an encoded serialization value corresponding to these spatial dispositions between the Z channel reference indicia. In the illustrative examples that follow, three Z channel reference indicia are employed to encode a two digit hexadecimal serialization value so that as many as 256 unique serialization values can be encoded. However, the skilled artisan readily recognizes that the claimed subject matter is not so limited to the illustrative embodiments.

Figure 6:
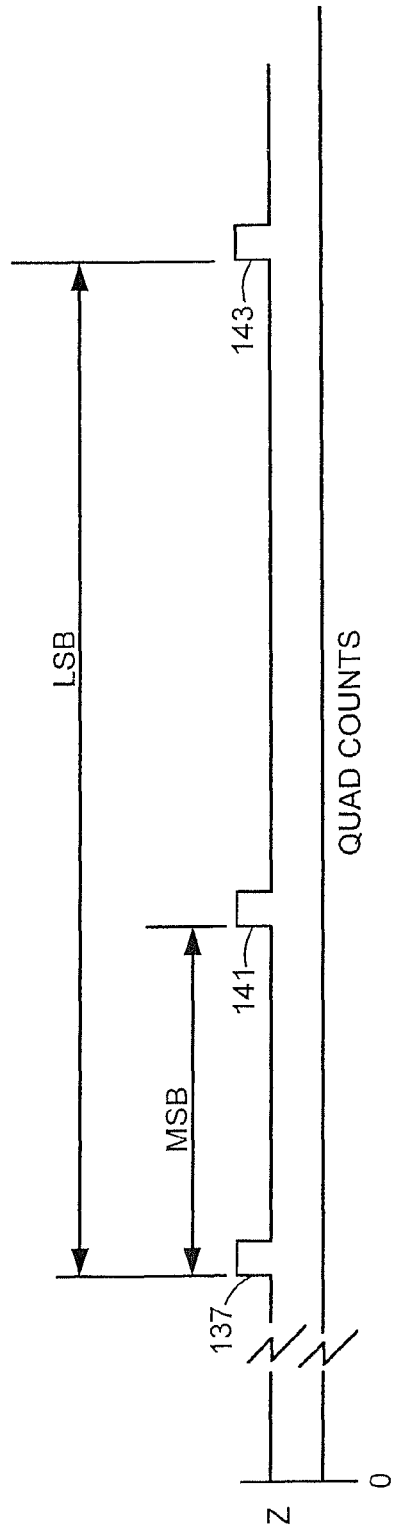
FIG. 6 graphically depicts spatial dispositions of first and second reference pulses in relation to a baseline reference pulse, the spatial dispositions defining serialization values in accordance with the claimed embodiments.

FIG. 6 graphically depicts how the reference indicia 140, 142 (FIG. 4) are encoded with respect to the baseline indicia 136 so that the corresponding pulses 137, 141, 143 to define a most significant bit (MSB) and a least significant bit (LSB) of the two digit hexadecimal value. To ensure adequate differentiation between two encoded serialization values, successive values are incremented by a predetermined number of reference displacement cycles. For purpose of this illustrative example, successive values are incremented by five reference cycles (20 quadrature counts). Assuming, also for an illustrative example, that the baseline reference pulse 137 occurs at quadrature count 310, the following relationship can then be used to identify the pallets:

$$PalletID = INT\left(\frac{MSB - 310}{20}\right) * 16 + INT\left(\frac{LSB - 310}{20}\right) + 1 \quad (1)$$

For example, for MSB of 320 counts and LSB of 340 counts:

$$PalletID = INT\left(\frac{320 - 310}{20}\right) * 16 + INT\left(\frac{340 - 310}{20}\right) + 1 \quad (2)$$

$$PalletID = 2$$

Note that stated another way, the two integer functions form the two digit hexadecimal value 01. The quantity 1 is added to this hexadecimal value solely for the purpose of making the lowest PalletID value a "1" instead of a "0." Table 1 shows a partial listing of the 256 serialization values that can be encoded in this manner:

TABLE 1

BASELINE REFERENCE PULSE AT 310 QUAD COUNTS

| MSB (quad counts) | LSB (quad counts) | hexidecimal value | PalletID |
|---|---|---|---|
| 320 | 320 | 00 | 1 |
| 320 | 340 | 01 | 2 |
| 320 | 360 | 02 | 3 |
| 320 | 380 | 03 | 4 |
| 320 | 400 | 04 | 5 |
| 320 | 420 | 05 | 6 |
| 320 | 440 | 06 | 7 |
| 320 | 460 | 07 | 8 |
| 320 | 480 | 08 | 9 |
| 320 | 500 | 09 | 10 |
| 320 | 520 | 0A | 11 |
| 320 | 540 | 0B | 12 |
| 320 | 560 | 0C | 13 |
| 320 | 580 | 0D | 14 |
| 320 | 600 | 0E | 15 |
| 320 | 620 | 0F | 16 |
| 340 | 320 | 10 | 17 |
| 340 | 340 | 11 | 18 |
| . | . | . | . |
| . | . | . | . |
| . | . | . | . |
| 600 | 600 | EE | 239 |
| 600 | 620 | EF | 240 |
| 620 | 320 | F0 | 241 |
| 620 | 340 | F1 | 242 |
| 620 | 360 | F2 | 243 |
| 620 | 380 | F3 | 244 |
| 620 | 400 | F4 | 245 |
| 620 | 420 | F5 | 246 |
| 620 | 440 | F6 | 247 |
| 620 | 460 | F7 | 248 |
| 620 | 480 | F8 | 249 |
| 620 | 500 | F9 | 250 |
| 620 | 520 | FA | 251 |
| 620 | 540 | FB | 252 |
| 620 | 560 | FC | 253 |
| 620 | 580 | FD | 254 |
| 620 | 600 | FE | 255 |
| 620 | 620 | FF | 256 |

If necessary, two identical sets of the reference indicia 136, 140, 142 can be stored to the media 124 in a mirrored arrangement so that they can be used in accordance with the present embodiments in either of opposing pallet 102 movement directions. The decoder circuit 126 can differentiate between which of the two sets of reference indicia to use in any of a number of ways, such as in relation to the AB pulse phase relationship.

The transducer 122 can have a write component as well to store data to the media 124. For example, parametric information yielded from a particular processing station, such as test results, can be stored to the media for use by subsequent stations.

Figure 7:
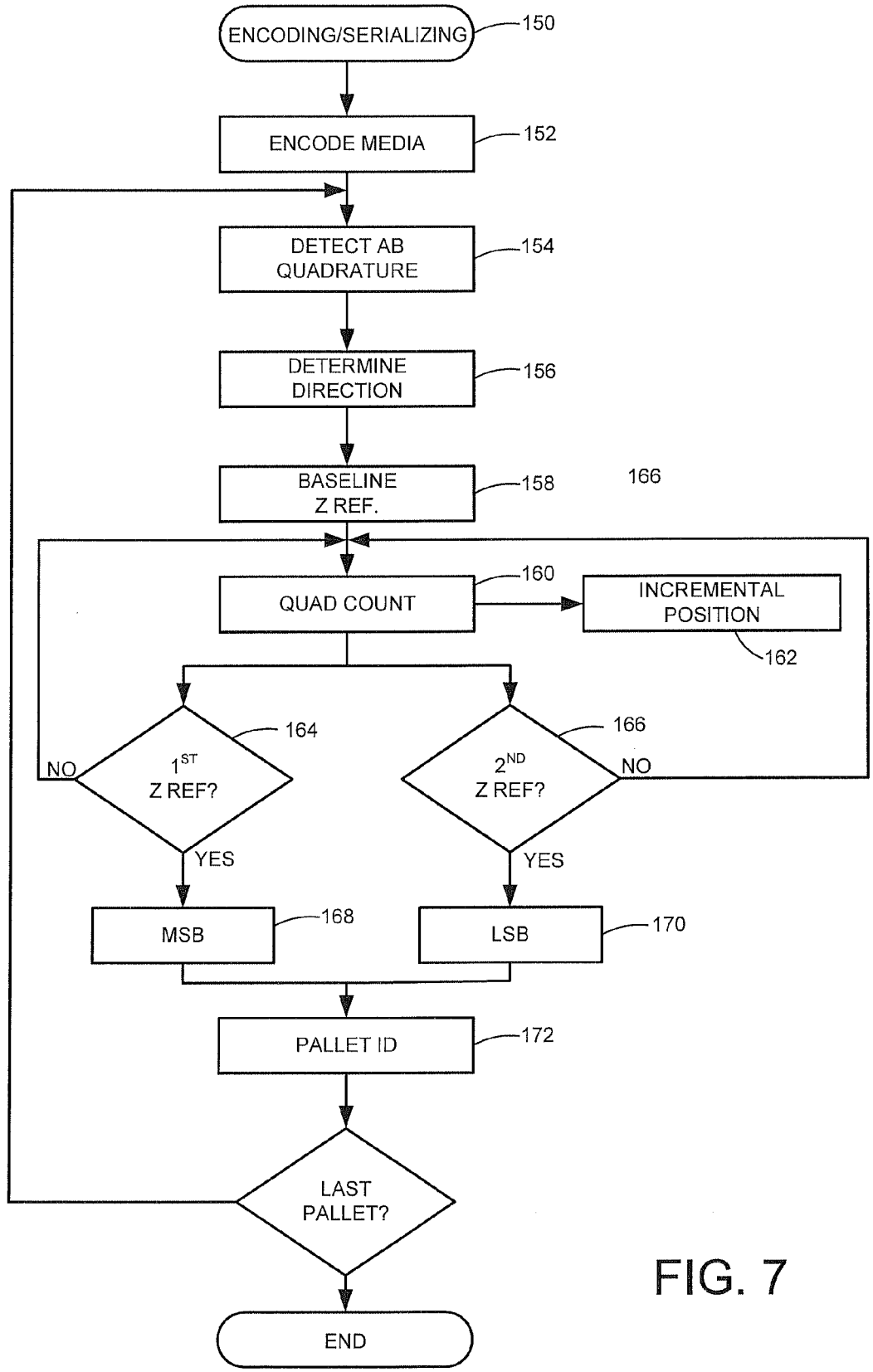
FIG. 7 is a flowchart depicting steps in a method for ENCODING/SERIALIZING in accordance with claimed embodiments.

FIG. 7 is a flowchart depicting steps in a method 150 that are executed for incrementally encoding the position of the pallet 102 while simultaneously serializing it. The method 150 begins in block 152 by storing the reference indicia 136, 140, 142 to each of the pallets 102 to define unique serialization patterns. As discussed, this involves storing indicia to a first media defining a first spatial disposition therebetween, and then storing indicia to a second media defining a second spatial disposition that is characteristically different than the first spatial disposition. In some embodiments the number of reference indicia defining the spatial dispositions can be two with respect to a baseline indicia, as illustrated in FIG. 6 and the descriptions thereof. In alternative equivalent embodiments more than two or less than two reference indicia can be used in relation to the baseline reference indicia. In any event, the spatial dispositions are varied to define a unique serialization value for each of the encoded media.

The method 150 continues in block 154 where the sensor 122 detects the encoded AB quadrature pattern waveform as the sensor 122 traverses the encoded media 124. In block 156 the decoder circuit 126 determines the direction of relative movement in terms of which waveform is leading the other.

In block 158 the decoder circuit 126 encounters the baseline reference pulse, which defines an absolute reference point. From that point the decoder circuit 126 counts AB quadrature pulses in block 160, combines the displacement associated with the quadrature count with the absolute reference from block 158, and then calculates an incremental position in block 162.

The method 150 continues to determine whether the first reference pulse 141 and the second reference pulse 143 have been detected in blocks 164 and 166, respectively. In both instances, if the determination is no, then control returns to block 160. If, on the other hand the determination is yes, then the MSB and LSB are calculated in blocks 168 and 170, respectively. As described above, the MSB and LSB values are associated with spatial dispositions of encoded indicia, and can be determined by counting the number of quadrature pulses (such as 130, 134) between the respective reference pulse (such as 141, 143) and the baseline reference pulse (such as 137). The PalletID is then calculated in terms of the MSB and LSB in block 172, such as by equation (1) in the illustrative embodiments described above. Finally, if the last pallet 102 has been processed then the method 150 ends; otherwise, control returns to block 154.

From the foregoing the skilled artisan will understand that the present embodiments generally contemplate an incremental encoder having a decoder circuit disposed in a data transfer relationship with encoded media to incrementally track position of an object to which the encoded media is affixed. The incremental encoder also includes means for identifying the object from a plurality of objects that are serialized via the encoded media.

For purposes of this description and meaning of the appended claims, the term "means for identifying" is expressly limited to the disclosed structure and equivalents thereof that are capable of both incrementally tracking the position of the object while simultaneously identifying the object from the same encoded media. That is, the meaning of the phrase "means for identifying" expressly does not include other previously attempted solutions that employ other indicia separate from the indicia used to incrementally track the position of the object. For example, the meaning of "means for identifying" expressly does not include previously attempted solutions such as radio frequency identification and bar code scanning that are not simultaneously used to incrementally track the position of a pallet within a processing station in order to fixture an object for a processing operation.

It is to be understood that even though numerous characteristics and advantages of various embodiments have been set forth in the foregoing description, together with details of the structure and function of various embodiments, this description is illustrative only, and changes may be made in detail, especially in matters of structure and arrangements of parts within the principles of the present embodiments to the full extent indicated by the broad general meaning of the terms in which the appended claims are expressed. For example, the particular elements may vary in type or arrangement without departing from the spirit and scope of the present embodiments.

In addition, although the embodiments described herein are described in relation to positioning an object in a conveyor system, it will be appreciated by those skilled in the art that the claimed subject matter is not so limited and various other positioning/identification systems can utilize the present embodiments without departing from the spirit and scope of the claimed embodiments.

What is claimed is:

1. A method of individually serializing each of a plurality of objects, the method comprising:
   storing first and second reference indicia at a first spatial separation therebetween to a first media on a first object of the plurality of objects;
   storing the first and the second reference indicia at a different second spatial separation therebetween to a second media on a second object of the plurality of objects;
   moving at least one of an incremental encoder and a selected one of either the first and second objects with respect to each other; and
   during the moving step, retrieving data with the incremental encoder from the selected object's stored indicia identifying a serialization value indicating which object of the plurality of objects is the selected object in the moving step.

2. The method of claim 1 wherein the storing indicia is characterized by each of the first and second spatial separations defining unique serialization values.

3. The method of claim 1 wherein each storing first and second reference indicia is characterized by storing displacement indicia to the respective media which when retrieved produce a reference pattern waveform characterized by periodic displacement pulses, and wherein the retrieving data is characterized by counting a number of the displacement pulses between each first and second reference indicia to determine the respective spatial disposition.

4. The method of claim 1 wherein the storing first and second reference indicia is characterized by storing a baseline reference indicia to the respective media.

5. The method of claim 1 wherein the storing first and second reference indicia is characterized by varying the spatial dispositions to define a unique two digit hexadecimal serialization value for each respective media.

6. The method of claim 1 wherein the retrieving data is characterized by incrementally positioning the plurality of objects as they are individually transported to a processor controlled station.

7. The method of claim 6 wherein the retrieving data is characterized by communicating the serialization value to the station.

8. The method of claim 6 wherein the retrieving data is characterized by the station storing parametric data to the media.

9. An incremental encoder apparatus comprising a decoder circuit that executes programming instructions stored in memory to retrieve stored data from a media, to determine from the stored data a spatial separation between first and second reference indicia, and to derive a serialization value identifying a selected object from a group of objects in relation to the determination of the spatial separation.

10. The apparatus of claim 9 wherein the decoder circuit counts periodic reference pulses from a displacement pattern waveform stored to the media in determining the spatial disposition between the first and second reference indicia.

11. The apparatus of claim 9 wherein the decoder circuit determines the spatial disposition with respect to a baseline reference indicia stored to the media.

12. The apparatus of claim 9 wherein the decoder circuit derives an encoded serialization value corresponding to the respective spatial disposition.

13. The apparatus of claim 9 wherein the decoder circuit derives an encoded two digit hexadecimal serialization value corresponding to the respective spatial disposition.

14. The apparatus of claim 9 comprising a positioning system transporting the plurality of objects to a processor controlled station and communicating the serialization value from the decoder circuit to the station.

15. The apparatus of claim 9 comprising part of a conveyor system transporting the plurality of objects along a conveyor path.

16. A method of individually serializing each of a plurality of objects, the method comprising:
- storing first indicia to a first media on a first object of the plurality of objects;
- storing second indicia that are characteristically different than the first indicia to a second media on a second object of the plurality of objects;
- moving at least one of an incremental encoder and a selected one of either the first and second objects with respect to each other;
- during the moving step retrieving data with the incremental encoder from the selected object's stored indicia identifying a serialization value indicating which object of the plurality of objects is the selected object in the moving step; and
- during the retrieving data step incrementally positioning the plurality of objects as they are individually transported to a processor controlled station.

17. The method of claim 16 wherein the retrieving data is characterized by communicating the serialization value to the station.

18. The method of claim 16 wherein the retrieving data is characterized by the station storing parametric data to the media.

19. The method of claim 16 wherein the retrieving data is characterized by deriving an encoded value corresponding to the respective indicia.

20. The method of claim 16 wherein the retrieving data is characterized by deriving an encoded two digit hexadecimal value corresponding to the respective indicia.

* * * * *